(12) United States Patent
Sandefur et al.

(10) Patent No.: US 6,403,797 B1
(45) Date of Patent: Jun. 11, 2002

(54) PROCESS FOR THE PREPARATION OF PERYLENE PIGMENTS

(75) Inventors: Charles W. Sandefur, Summerville; Brian L. Thompson, Goose Creek; Michael J. Greene; Gregory R. Schulz, both of Mt. Pleasant, all of SC (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/747,058

(22) Filed: Dec. 22, 2000

(51) Int. Cl.$^7$ ............... C07D 221/00; C07D 309/00; C09B 3/14; C09B 3/18
(52) U.S. Cl. ............ 546/37; 106/493; 106/494; 106/498; 106/499
(58) Field of Search .................. 106/498, 493, 106/494, 499; 546/37

(56) References Cited

U.S. PATENT DOCUMENTS

| | | | |
|---|---|---|---|
| 4,431,806 A | 2/1984 | Spietschka et al. | 546/37 |
| 4,496,731 A | 1/1985 | Spietschka et al. | 546/37 |
| 4,797,162 A | 1/1989 | Spietschka et al. | 106/498 |
| 5,248,774 A | 9/1993 | Dietz et al. | 544/125 |
| 5,264,034 A | 11/1993 | Dietz et al. | 106/493 |
| 5,466,807 A | 11/1995 | Dietz et al. | 546/6 |
| 5,472,494 A | 12/1995 | Hetzenegger et al. | 106/493 |
| 5,662,739 A | 9/1997 | Urban et al. | 106/497 |
| 5,900,050 A | 5/1999 | Hayden et al. | 106/493 |
| 6,015,458 A * | 1/2000 | Schulz | |
| 6,039,769 A | 3/2000 | Schulz et al. | 8/574 |
| 6,143,068 A | 11/2000 | Schulz et al. | 106/498 |
| 6,153,764 A | 11/2000 | Schulz et al. | 548/433 |

FOREIGN PATENT DOCUMENTS

EP  0 758 004  2/1997

OTHER PUBLICATIONS

H. Herbst and K. Hunger, Industrial Organic Pigments, 2$^{nd}$ ed. (NY: VCH Publishers, Inc., (month Unvailable) 1997, pp. 9 and 476–479, 1,3,2 Polycyclic Pigments and 3,4 Perylene and Perinone Pigments.

H. Zollinger, Color Chemistry (VCH Verlagsgessellschaft, (month unavailable) 1991, pp. 227–228 and 297–298–Higher Anellated Vat Dyes—Physical Conditioning of Pigments.

M.A. Perkins, "Pyridines and Pyridones" in the Chemistry of Snythetic Dyes and Pigments, Ed. H.A. Lubs (malabar Florida: Rober E. Krieger Publishing Company (month unavailable) 1955, pp. 481–482.

K. Merkle and H. Schäfer, Surface Treatment of Organic Pigments in Pigment Handbook, vol. III (NY: John Wiley & Sons, Inc., (month unavailable) 1973), pp. 157–167.

R.B. McKay, "The Development of Organic Pigments with Particular Reference to Physical Form And Consequent Behavior in Use" in Rev. Prog. Coloration, 10, pp. 25–32 (month unavailable) 1979.

R.B. McKay, Control of the application performance of classical organic pigments: in JOCCA pp. 89–93, (month unavailable) 1989.

\* cited by examiner

Primary Examiner—D. Margaret Seaman
(74) Attorney, Agent, or Firm—Joseph C. Gil; Thomas W. Roy; Richard E.L. Henderson

(57) ABSTRACT

This invention relates to a process for preparing perylene pigment compositions by
(a) reacting, at a temperature of less than about 25° C., a mixture of
   (1) a perylene tetracarboxylic compound,
   (2) at least about 0.1% by weight, relative to the perylene tetracarboxylic compound, of a surfactant of formula (I)

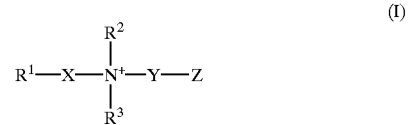

wherein $R^1$, $R^2$, $R^3$, X, Y, Z, and Z' are defined herein,
   (3) an equivalent excess, relative to the amount of the perylene tetracarboxylic compound, of ammonia or a primary amine $R^A$—$NH_2$, wherein $R^A$ is defined herein, and
   (4) optionally, a solvent,
   to form a perylene intermediate;
(b) heating the perylene intermediate at a temperature of about 50° C. to about 250° C., optionally in the presence of certain non-pigmentary cyclic anhydrides or imides and/or solvents; and
(c) collecting the perylene pigment composition.

12 Claims, No Drawings

PROCESS FOR THE PREPARATION OF PERYLENE PIGMENTS

BACKGROUND OF THE INVENTION

This invention relates to a process for preparing perylene pigment compositions using certain amphoteric surfactants and non-pigmentary cyclic anhydrides and imides. Perylenes, including diimides of perylene-3,4,9,10-tetracarboxylic acid, can be prepared by methods known in the art. E.g., W. Herbst and K. Hunger, *Industrial Organic Pigments*, 2nd ed. (New York: VCH Publishers, Inc., 1997), pages 9 and 476–479; H. Zollinger, *Color Chemistry* (VCH Verlagsgessellschaft, 1991), pages 227–228 and 297–298; and M. A. Perkins, "Pyridines and Pyridones" in *The Chemistry of Synthetic Dyes and Pigments*, ed. H. A. Lubs (Malabar, Fla.: Robert E. Krieger Publishing Company, 1955), pages 481–482; see also U.S. Pat. Nos. 4,431,806, 4,496,731, 4,797,162, 5,248,774, 5,264,034, and 5,466,807. Perylenes as initially isolated in the process of the present invention, often referred to as crude perylenes, are generally unsuitable for use as pigments and thus must be subjected to one or more additional finishing steps that modify particle size, particle shape, and/or crystal structure in such a way that provides good pigmentary quality. See, for example, K. Merkle and H. Schäfer, "Surface Treatment of Organic Pigments" in *Pigment Handbook*, Vol. III (New York: John Wiley & Sons, Inc., 1973), page 157; R. B. McKay, "The Development of Organic Pigments with Particular Reference to Physical Form and Consequent Behavior in Use" in *Rev. Prog. Coloration*, 10, 25–32 (1979); and R. B. McKay, "Control of the application performance of classical organic pigments" in JOCCA, 89–93 (1989).

The addition of certain perylene derivatives to the ring-closure step has been reported to improve the resultant pigments. For example, U.S. Pat. No. 5,264,034 discloses the use of certain perylene bis-imides or imide-anhydrides to improve the coloristic and rheological properties of perylene pigments. U.S. Pat. No. 5,248,774 discloses certain amphoteric perylene bis-imide derivatives for use as colorants or as surface-modifying agents for known perylene pigments. U.S. Pat. No. 5,472,494 discloses the use of certain perylene mono-imide derivatives to modify the properties of organic pigments. These patents do not, however, disclose the use of amphoteric surfactants.

U.S. Pat. No. 4,496,731 discloses a stepwise preparation of N,N-dialkylated perylene pigments in which a perylene-3,4,9,10-tetracarboxylic acid dianhydride first reacts with an alkylamine to form the corresponding ring-opened dialkyl-diimide that is then thermally ring closed to form the pigment. Surfactants can optionally be added before, during, or after the cyclization reaction. Although anionic and cationic surfactants are disclosed, the patent does not mention amphoteric surfactants.

U.S. Pat. Nos. 6,015,458, 6,039,769, 6,143,068, and 6,153,764 and U.S. application Ser. No. 09/491,493 disclose the preparation of perylene pigments in the presence of certain non-pigmentary cyclic arihydrides and imides. Although anionic, cationic, and non-ionic surfactants are disclosed, amphoteric surfactants are not mentioned.

The treatment of organic pigments with nitrogen-containing surfactants is also known. For example, U.S. Pat. No. 5,662,739 describes a method for improving the dispersibility of quinacridone and dioxazine pigments using certain fatty acid taurides. This patent, however, does not disclose amphoteric surfactants such as used in the present invention. European Patent Application 758,004 describes a method for improving the dispersibility for a specific pigment, Pigment Yellow 12, by carrying out the preparative coupling reaction in the presence of certain cationic and amine oxide surfactants. The European application, however, does not mention other types of pigments. U.S. Pat. No. 5,900,050 describes a method for conditioning organic pigments with nitrogen-containing amphoteric surfactants such as those used in the present invention but does not disclose their inclusion in the pigment-forming process and does not describe their the use in conjunction with cyclic anhydrides and imides.

An object of the present invention was reducing or eliminating the use of strong acids and eliminating further surface treatment steps while at the same time providing organic pigments that can be easily dispersed in plastics. It has now been found that the presence of certain amphoteric surfactants during the conversion of perylene precursors to corresponding perylene pigments and subsequent treatment with certain non-pigmentary cyclic anhydrides and imides provides pigment compositions having improved color properties and dispersability, even in the unfinished form that is initially isolated.

SUMMARY OF THE INVENTION

This invention relates a process for preparing perylene pigment compositions comprising
(a) reacting, at a temperature of less than about 25° C. (preferably from about 0° C. to about 20° C.), a mixture comprising
  (1) a perylene tetracarboxylic compound,
  (2) at least about 0.1% by weight (preferably 0.1 to 100% by weight, more preferably 2 to 15% by weight), relative to the perylene tetracarboxylic compound, of one or more surfactants of formula (I)

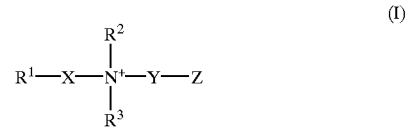

wherein
    $R^1$ is a straight or branched chain $C_8$–$C_{30}$ aliphatic group or a modified straight or branched chain $C_8$–$C_{30}$ aliphatic group in which at least one carbon atom in the main chain of the aliphatic group is replaced with —O—, —S—, —CONH—, —NHCO—, —CH=CH—, —OSi($C_1$–$C_4$ alkyl)$_2$—, or optionally substituted $C_5$–$C_7$ cycloalkylene,
    $R^2$ is hydrogen, $C_1$–$C_6$ alkyl, or —Y—Z',
    $R^3$ is hydrogen or $C_1$–$C_6$ alkyl, or $R^2$ and $R^3$ together are $C_4$–$C_7$ alkylene,
    X is a direct bond or —NHC(=NH)—, or X and $R^2$ taken together with the $N^+$ form a five- to seven-membered heterocyclic ring,
    Y is difunctional $C_1$–$C_8$ (cyclo)aliphatic,
    Z is —COO$^-$, —SO$_3^-$, —PO$_3^-$. 1/n $M^{n+}$ (wherein $M^{n+}$ is a hydrogen ion or an n-valent cation), or OH, and
    Z' is —COO$^-$. 1/n $M^{N+}$, —SO$_3^-$. 1/n $M^{n+}$, or —PO$_3^-$ .2/n $M^{n+}$ (wherein $M^{n+}$ is a hydrogen ion and/or an n-valent cation) or OH, with the proviso that Z' and Z cannot both be OH,
  (3) an equivalent excess, relative to the amount of the perylene tetracarboxylic compound, of ammonia or a primary amine having the formula $R^A$—$NH_2$, wherein $R^A$ is $C_1$–$C_6$ alkyl, $C_7$–$C_{16}$ aralkyl, or $C_6$–$C_{10}$ aryl, and (4) 0 to about 100 parts by weight, per part by weight of the perylene tetracarboxylic compound, of a solvent (preferably water), to form a perylene intermediate;

(b) heating the perylene intermediate at a temperature of about 50° C. to about 250° C. (preferably from about 120° C. to about 150° C.) in the presence of (1) 0 to about 20% by weight (preferably 5 to 15% by weight), relative to the perylene intermediate, of a non-pigmentary cyclic anhydride or imide having the formula (II)

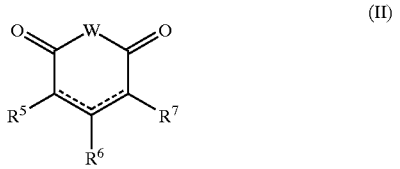

(II)

wherein

W is O or $NR^4$, $R^4$ is hydrogen, a metal, $C_1–C_6$ alkyl, $C_5–C_8$ cycloalkyl, $C_7–C_{16}$ aralkyl, $C_6–C_{10}$ aryl, or —Alk—X, $R^5$, $R^6$, and $R^7$ are independently hydrogen, $C_1–C_6$ alkyl, $C_7–C_{16}$ aralkyl, or $C_6–C_{10}$ aryl, or $R^5$ and $R^6$ together are fused-on rings (preferably fused-on cycloalkane or aromatic rings) and $R^7$ is hydrogen, $C_1–C_6$ alkyl, $C_7–C_{16}$ aralkyl, or $C_6–C_{10}$ aryl, or $R^5$, $R^6$, and $R^7$ together are fused-on rings (preferably fused-on cycloalkane or aromatic rings), the dotted line is an optional double bond representing $R^5$—C=C—$R^6$ or $R^6$—C=C—$R^7$ (including a formal double bond of any fused-on aromatic ring formed by $R^5$ and $R^6$ taken together or by $R^5$, $R^6$, and $R^7$ taken together), Alk is $C_1–C_{18}$ alkylene or $C_5–C_8$ cycloalkylene, and X is (i) an anionic group selected from —$SO_3^-$, —$COO^-$, —$PO_3^=$, —$PO(OR^x)O^-$ (wherein $R^x$ is $C_1–C_6$ alkyl), —O—$PO_3^=$, and —O—PO$(OR^y)O^-$ (wherein $R^y$ is $C_1–C_6$ alkyl), each such anionic group being electrically balanced with a stoichiometric amount of a cation (preferably a hydrogen, metal, and/or ammonium ion), (ii) a cationic group having the formula —$NR^aR^bR^{c+}$ (wherein $R^a$, $R^b$, and $R^c$, are independently hydrogen, $C_1–C_6$ alkyl, $C_7–C_{16}$ aralkyl, or $C_6–C_{10}$ aryl), each such cationic group being electrically balanced with a stoichiometric amount of an anion (preferably halide, sulfate, phosphate, nitrate, mesylate, or tosylate or, less preferably, hydroxide), (iii) $NR^dR^e$, wherein $R^d$ is hydrogen, $C_1–C_6$ alkyl, $C_7–C_{16}$ aralkyl, $C_6–C_{10}$ aryl, $C_2–C_6$ alkanoyl, $C_7–C_{11}$ aroyl, or sulfonyl and $R^e$ is hydrogen, $C_1–C_6$ alkyl, $C_7–C_{16}$ aralkyl, or $C_6–C_{10}$ aryl, (iv) $OR^f$, wherein $R^f$ is hydrogen, $C_1–C_6$ alkyl, or $C_6–C_{10}$ aryl, (v) $COOR^g$, wherein $R^g$ is $C_1–C_6$ alkyl, $C_7–C_{16}$ aralkyl, or $C_6–C_{10}$ aryl, (vi) sulfonyl, or (vii) $C_6–C_{10}$ aryl; and (2) 0 to about 30 parts by weight (preferably 7 to 20 parts by weight), relative to the perylene intermediate, of a solvent, thereby forming the perylene pigment composition; and (c) collecting the perylene pigment composition.

The invention further relates to perylene pigment compositions prepared in this manner.

DETAILED DESCRIPTION OF THE INVENTION

Perylene tetracarboxylic compounds that can be used for the preparation of the pigmentary perylene compositions of the present invention include various carboxylic acids, carboxylic esters, carboxamides, cyclic anhydrides, and/or cyclic imides of formula (III)

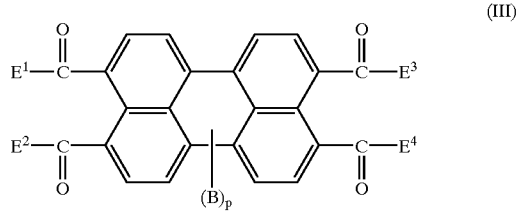

(III)

wherein $E^1$ and $E^3$ are independently OR or NR'R" and $E^2$ and $E^4$ are independently OR, or $E^1$ and $E^2$ together are O or $NA^1$ and $E^3$ and $E^4$ together are O or $NA^2$, each R is independently hydrogen (i.e., for free acid groups), a metal or ammonium cation (i.e., for salts), $C_1–C_6$ alkyl (i.e., for alkyl esters), $C_7–C_{16}$ aralkyl (i.e., for aralkyl esters), or $C_6–C_{10}$ aryl (i.e., for aryl esters), each R' and R" is independently hydrogen, $C_1–C_6$.alkyl, or $C_7–C_{16}$ aralkyl, $A^1$ and $A^2$ are independently (but are preferably identically) hydrogen, a metal, $C_1–C_6$ alkyl or substituted $C_1–C_6$ alkyl, $C_5–C_8$ cycloalkyl or substituted $C_5–C_8$ cycloalkyl, $C_7–C_{16}$ aralkyl or substituted $C_7–C_{16}$ aralkyl, or $C_6–C_{10}$ aryl or substituted $C_6–C_{10}$ aryl, B is $C_1–C_6$ alkyl, $C_1–C_6$ alkoxy, a sulfonyl group, amino, ammonium, hydroxy, nitro, or halogen, and p is zero or an integer of from 1 to 8.

Preferred perylene tetracarboxylic compounds of component (a)(1) are symmetrical perylene bis-anhydrides in which $E^1$ and $E^2$ together and $E^3$ and $E^4$ together are oxygen atoms. Preferred perylene tetracarboxylic compounds have no aromatic ring substituents B (i.e., p is zero), but substituted perylene tetracarboxylic compounds in which at least one of the eight substitutable aromatic ring carbon atoms of the perylene moiety has at least one group B (i.e., where p is not zero) are also suitable. Some of the perylene tetracarboxylic compounds can themselves be pigments but it is not necessary for the compounds to be pigments as long as the ultimate perylene pigment composition is pigmentary.

When used to describe the perylene tetracarboxylic compounds used in step (a), the term "$C_1–C_6$ alkyl" refers to straight or branched chain aliphatic hydrocarbon groups having from 1 to 6 carbon atoms. Examples of $C_1–C_6$ alkyl are methyl, ethyl, propyl, butyl, pentyl, hexyl, and the isomeric forms thereof. The term "$C_5–C_8$ cycloalkyl" refers to cycloaliphatic hydrocarbon groups having from 5 to 8 carbon atoms. Examples of $C_5–C_8$ cycloalkyl are cyclopentyl, cyclohexyl, cycloheptyl, and cyclooctyl. The term "$C_6–C_{10}$ aryl" refers to phenyl and 1- or 2-naphthyl. The term "$C_7–C_{16}$ aralkyl" refers to $C_1–C_6$ alkyl substituted with $C_6–C_{10}$ aryl such that the total number of carbon atoms is from 7 to 16. Examples of $C_7$–$C_{16}$ aralkyl are benzyl, phenethyl, and naphthylmethyl. Substituted alkyl groups are those in which one or more carbon atoms are substituted with alkoxy, halogen, hydroxy (including tautomeric oxo forms), alkoxycarbonyl, aryloxycarbonyl, cyano, and nitro as defined herein. Substituted aryl and aralkyl groups are those in which one or more carbon atoms are substituted with alkyl, alkoxy, halogen, hydroxy (including tautomeric oxo forms), alkoxycarbonyl, aryloxycarbonyl, cyano, and nitro as defined herein.,The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. The term "sulfonyl group" refers to —$SO_2$—$R^i$ groups, such as alkylsulfonyl (in which $R^i$ is alkyl; for example, methylsulfonyl or ethanesulfonyl), arylsulfonyl (in which $R^i$ is aryl; for example, phenylsulfonyl, 1- or 2-naphthylsulfonyl, and substituted forms such as toluenesulfonyl), sulfoxyl and corresponding esters (in which $R^i$ is OH, alkoxy, cycloalkoxy, aralkoxy, aryloxy), and sulfonamides (in which $R^i$ is —$NR^{ii}R^{iii}$ wherein $R^{ii}$ and $R^{iii}$ are independently hydrogen, alkyl, cycloalkyl, aralkyl, or aryl). The terms "amino" and "ammonium" refer respectively to —$NR^{iv}R^v$ and —$NR^{iv}R^vR^{vi+}$ in which $R^{iv}$, $R^v$, and $R^{vi}$ are independently hydrogen, $C_1$–$C_6$ alkyl, or $C_7$–$C_{16}$ aralkyl and each ammonium group is electrically balanced with a stoichiometric amount of an anion. The term "halogen" includes fluorine, chlorine, bromine, and iodine.

It is possible to use salt forms of the perylene tetracarboxylic compounds if at least one of groups $E^1$, $E^2$, $E^3$, and $E^4$ of formula (III) represents a carboxylate anion or an imide form. Suitable carboxylic salts are those in which each anionic carboxylate anion is electrically balanced with a 1/n molar equivalents of an n-valent cation $M^{n+}$ (such as $Li^+$, $Na^+$, $K^+$, $Mg^{++}$, $Ca^{++}$, $Ba^{++}$, $Al^{+++}$, $Fe^{++}$, or $Fe^{+++}$) or an ammonium ion having the formula $R^IR^{II}R^{III}R^{IV}N^+$ (wherein $R^I$, $R^{II}$, $R^{III}$, and $R^{IV}$ are independently hydrogen, $C_1$–$C_6$ alkyl, $C_1$–$C_6$ hydroxyalkyl, or $C_7$–$C_{16}$ aralkyl). In general, free acids in which at least one of $E^1$, $E^2$, $E^3$, and $E^4$ is OH are initially added to the reaction mixture but are converted to corresponding amine salts by an in situ acid-base reaction with the ammonia or primary amine $R^A$—$NH_2$. Suitable imide salts of formula (III) are perylenes in which at least one of $A^1$ or $A^2$ represents 1/n molar equivalents of an n-valent cation $M^{n+}$ (such as $Li^+$, $Na^+$, $K^+$, $Mg^{++}$, $Ca^{++}$, $Ba^{++}$, $Al^{+++}$, $Fe^{++}$, or $Fe^{+++}$). Such salts are formed whenever imides of formula (III) in which $A^1$ and/or $A^2$ is hydrogen are exposed to strongly basic media, either during the reaction conditions used to prepare the perylene imide or by addition of a strong base.

The perylene tetracarboxylic compounds described above, some of which are crude or conditioned perylene pigments and some of which are precursors of perylene pigment, can be prepared by any of various methods known in the art. E.g., W. Herbst and K. Hunger, *Industrial Organic Pigments*, 2nd ed. (New York: VCH Publishers, Inc., 1997), pages 476479; H. Zollinger, *Color Chemistry* (VCH Verlagsgessellschaft, 1991), pages 227–228; M. A. Perkins, "Pyridines and Pyridones" in The *Chemistry of Synthetic Dyes and Pigments*, ed. H. A. Lubs (Malabar, Fla.: Robert E. Krieger. Publishing Company, 1955), pages 481–482; and F. Graser, "Perylenes" in Pigment Handbook, 2nd edition, Vol. III (New York: John Wiley & Sons, Inc., 1988), pages 653–658.

A critical feature of the invention is the addition of certain nitrogen-containing amphoteric surfactants before or during the initial reaction of the perylene tetracarboxylic compound with ammonia or a primary amine $R^A$—$H_2$. Suitable amphoteric surfactants are compounds represented by formula (I)

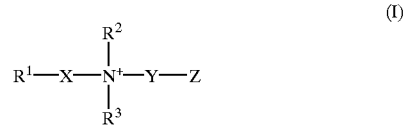

in which $R^1$, $R^2$, $R^3$, X, Y, and Z are defined as above. One skilled in the art would, of course, understand that when at least one of $R^2$ or $R^3$ represents hydrogen, compounds represented by formula (I) may not actually exist in the zwitterionic form represented. That is, depending on the relative $PK_a$ values for the nitrogen atom and the carboxyl, sulfonyl, or phosponyl functions of groups Z and/or Z' (as well as on the pH of the reaction mixture), the nitrogen atom may actually be deprotonated. For example, exposure to the basic reaction medium may deprotonate the nitrogen atom. As used herein, formula (I) is intended to include all such species.

The term "$C_8$–$C_{30}$ aliphatic" as used herein with respect to the descriptions of the surfactants refers to straight or branched chain aliphatic hydrocarbon groups having from 8 to 30 carbon atoms that can optionally be modified by replacing one or more carbon atoms in the main chain with —O—, —S—, —CONH—, —NHCO—, —CH═CH—, —OSi(alkyl)$_2$—, or $C_5$–$C_7$ cycloalkylene in a chemically reasonable manner. When two or more such groups are present, they must, of course, also be present in chemically reasonable combinations. For example, heteroatoms are preferably not located adjacent to each other or, when X is a direct bond, adjacent to the $N^+$ of formula (I). Furthermore, —O—, —S—, —CONH—, and —NHCO—groups cannot be attached directly to the $N^+$ of formula (I). In addition to optional branching (which, in effect, corresponds to alkyl substitution of a linear chain), the $C_8$–$C_{30}$ aliphatic groups (including any —CH═CH—and $C_5$–$C_7$ cycloalkylene) can be substituted with groups such as $C_1$–$C_6$ alkoxy, halogen (especially fluorine in —$CF_2$— groups), hydroxy, oxo (i.e., as a keto oxygen), ($C_1$–$C_6$ alkoxy)carbonyl, ($C_6$–$C_{10}$ aryloxy)carbonyl, and cyano. Suitable $C_8$–$C_{30}$ aliphatic groups include alkyl groups such as octyl, decyl, undecyl, lauryl (i.e., dodecyl), myristyl (i.e., tetradecyl), cetyl (i.e., hexadecyl), stearyl (i.e., octadecyl), eicosanyl, and docosanyl, as well as isomeric forms thereof; corresponding alkenyl, alkadienyl, and alkatrienyl groups such as 8-heptadecenyl or 9-octadecenyl (as its oleyl Z-isomer or elaidyl E-isomer); amidoalkyl groups such as cocamidoalkyl (i.e., coconut fatty acid amides of aminoalkyl groups, particularly cocamidopropyl) and ricinoleamidoalkyl (particularly ricinoleamidopropyl); and polyethers such as polyalkylenoxyalkyl (particularly polyethylenoxyethyl or polypropylenoxypropyl). Particularly preferred $C_8$–$C_{30}$ aliphatic groups include cocamidopropyl, lauryl, stearyl, 8-heptadecenyl, and oleyl. It is also possible, although not preferred, to replace some or all of the main-chain carbon atoms of group $R^1$ with —OSi($C_1$–$C_4$ alkyl)$_2$— groups, which means that the term "$C_8$–$C_{30}$ aliphatic" as used herein also includes polysiloxane groups in which silicon and oxygen atoms are not attached directly to the nitrogen atom of compounds of formula (I) but are instead attached through one or more intervening carbon atoms.

The term "difunctional $C_1$–$C_8$ (cyclo)aliphatic" as used herein with respect to the definition of Y in the surfactants refers to straight or branched chain difunctional aliphatic hydrocarbon groups having from 1 to 8 carbon atoms and to cyclic hydrocarbon groups having 5 to 8 ring carbon atoms, as well as to difunctional $C_5$–$C_7$ cycloaliphatic groups that can be attached to either or both of group Z and the nitrogen atom of compounds of formula (I) through methylene, ethylene, or propylene groups, provided that the total number of main-chain and ring carbon atoms does not exceed eight. Examples of difunctional $C_1$–$C_8$ (cyclo)aliphatic groups are $C_1$–$C_8$ alkylene, such as propylene, butylene, pentylene, hexylene, heptylene, and octylene (and alkyl-substituted derivatives up to a total of eight carbon atoms), and $C_5$–$C_8$ cycloalkylene, such as 1,2- and 1,3-cyclopentylene, 1,2-, 1,3-, and 1,4-cyclohexylene, and 1,2-, 1,3-, and 1,4-cycloheptylene. Carbon-carbon double bonds can also be present in the chain as long as they are not adjacent to the $N^+$ of formula (I) or to OH. Although generally not preferred, it is also possible to replace one or more carbon atoms in the aliphatic chain and/or cycloaliphatic ring with heteroatoms such as N (e.g., as NH or N-alkyl), O, or S as long as such heteroatoms are not located adjacent to each other or to the $N^+$ and Z (and/or optional Z') of formula (I). Preferred difunctional (cyclo) aliphatic groups are $C_1$–$C_6$ alkylene groups, especially methylene and ethylene groups.

The term "$C_1$–$C_6$ alkyl" refers to straight or branched chain aliphatic hydrocarbon groups having from 1 to 6 carbon atoms, also referred to as lower alkyl. Examples of $C_1$–$C_6$ alkyl are methyl, ethyl, propyl, butyl, pentyl, hexyl, and the isomeric forms thereof. The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. The term "$C_7$–$C_{16}$ aralkyl" refers to $C_1$–$C_6$ alkyl substituted with $C_6$–$C_{10}$ aryl such that the total number of carbon atoms is from 7 to 16. Examples of $C_7$–$C_{16}$ aralkyl are benzyl, phenethyl, and naphthylmethyl. The term "($C_1$–$C_6$ alkoxy)carbonyl" refers to straight or branched chain alkoxycarbonyl groups having from 1 to 6 carbon atoms in the alkoxy portion. Examples of ($C_1$–$C_6$ alkoxy)carbonyl are methoxycarbonyl, ethoxycarbonyl, propoxycarbonyl, butoxycarbonyl, pentyloxycarbonyl, hexyloxycarbonyl, and the isomeric forms thereof. The term "($C_6$–$C_{10}$ aryloxy)carbonyl" refers to phenoxycarbonyl and 1- or 2-naphthoxycarbonyl, in which the aryl portion can optionally be further substituted with halogen, alkyl, alkoxy, alkoxycarbonyl, or nitro. Examples of halogen are fluorine, chlorine, bromine, and iodine.

Surfactants of formula (I) that contain cations include compounds of formula (I) in which Z is —$PO_3^=$.1/n $M^{n+}$ and/or in which $R^2$ is —Y—$COO^-$.1/n $M^{n+}$, —Y—$SO_3^-$.1/n $M^{n+}$, or —Y—$PO_3^=$.2/n $M^{n+}$, where $M^{n+}$ in each case is a hydrogen ion and/or an n-valent cation. Suitable cations include metal ions, such as alkali metal ions (e.g., lithium, sodium, or potassium ions), alkaline earth ions (e.g., magnesium or calcium ions), aluminum ions, iron(II) or iron(III) ions, and ammonium ions such as $R^I R^{II} R^{III} R^{IV} N^+$ (wherein $R^I$, $R^{II}$, $R^{III}$, and $R^{IV}$ are independently hydrogen, $C_1$–$C_6$ alkyl, $C_1$–$C_6$ hydroxyalkyl, $C_7$–$C_{16}$ aralkyl, and the like, such as $NH_4^+$).

Surfactants of formula (I) that do not contain heterocyclic rings formed by X and $R^2$ taken together are generally more preferred than those containing heterocyclic rings.

Preferred non-cyclic surfactants of formula (I) are those in which $R^1$ is $C_8$–$C_{30}$ aliphatic or modified $C_8$–$C_{30}$ aliphatic in which at least one carbon atom in the main chain is replaced with —O—, —CONH—, —NHCO—, or —CH=CH—; $R^2$ and $R^3$ are independently hydrogen or $C_1$–$C_6$ alkyl (preferably an alkyl group such as methyl); X is a direct bond or —NHC(=NH)—; Y is $C_1$–$C_6$ alkylene (preferably methylene or ethylene); and Z is —$COO^-$, or —$SO_3^-$. Especially preferred surfactants of formula (I) are cocamidopropyl betaine, an amphoteric surfactant in which $R^1$ is cocamidopropyl, $R^2$ and $R^3$ are methyl, X is a direct bond, Y is methylene, and Z is —$COO^-$, and N-3-(cocamido)propyl-N-(2-hydroxy-3-sulfopropyl)-N,N-dimethylbetaine, an amphoteric surfactant in which $R^1$ is cocamidopropyl, $R^2$ and $R^3$ are methyl, X is a direct bond, Y is 2-hydroxypropyl, and Z is —$SO_3^-$.

Cyclic surfactants of formula (I), in which X and $R^2$ together with the $N^+$ forms five- to seven-membered rings, are heterocyclic compounds containing at least the one ring nitrogen atom shown in the formula. Group X of such heterocyclic compounds is not a direct bond but must always contain at least one atom such that group $R^1$ is not connected directly to the nitrogen atom shown in formula (I). Group X can contain more than one such atom as long as the resultant heterocyclic ring contains no more than seven ring atoms. For example, group X can be groups having the formulas

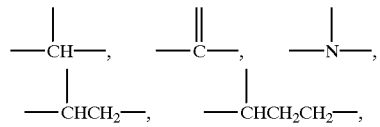

and the like, thereby forming heterocyclic rings that can be represented by the following formulas

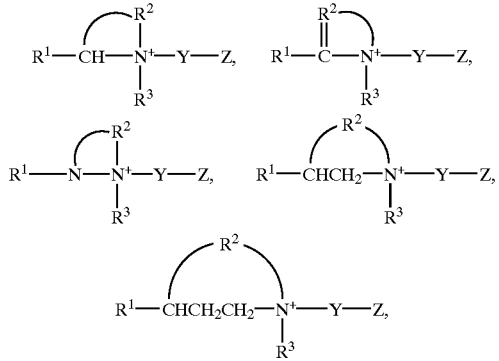

and the like (in which $R^1$, $R^3$, Y, and Z are defined as above and $R^2$ completes a five- to seven-membered ring). The heterocyclic moiety can be unsaturated, including being an aromatic ring as long as group Y is not attached to an aromatic quaternary ring nitrogen. The heterocyclic moiety can also contain additional heteroatoms such as N, O, or S in place of one or more ring carbon atoms, preferably such that no two heteroatoms are directly bonded to each other. Heterocyclic ring systems that can be incorporated into surfactants of formula (I) include imidazolines, imidazoles, oxazolidines, oxazolines, and oxazoles. Preferred heterocyclic ring systems are imidazolines in which group $R^1$ is attached to the C-2 ring carbon atom and Y is attached to one of the ring nitrogen atoms. A particularly preferred surfactant containing such heterocyclic moieties is 4,5-dihydro-1-(hydroxyethyl)-1(or 3)-(2-hydroxy-3-sulfopropyl)-2-norcocoalkylimidazolinium inner salt, an amphoteric compound within the scope of formula (I) and represented by one or both of the following formulas

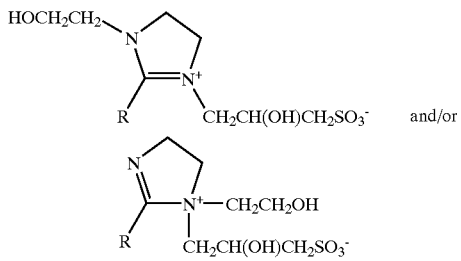

where R represents norcocoalkyl.

Mixtures of the surfactants described above are, of course, also suitable.

Solvents that can be used in step (a) are liquids that are capable of dissolving and/or suspending the components of the reaction mixture without significantly decomposing or otherwise reacting during the reaction. Examples of suitable solvents include water; monofunctional alcohols, particularly lower alkanols such as methanol, ethanol, butanol, pentanol, hexanol, and isomeric forms thereof; amides such as dimethylformamide and dimethylacetamide; ketones and ketone alcohols such as acetone and diacetone alcohol; ethers such as tetrahydrofuran and dioxane; alkylene glycols and thioglycols such as ethylene glycol, propylene glycol, butylene glycol, triethylene glycol, hexylene glycol, diethylene glycol, and thiodiglycol; polyalkylene glycols, such as polyethylene glycol and polypropylene glycol; other polypls, such as glycerol and 1,2,6-hexanetriol; lower alkyl ethers of polyhydric alcohols, such as 2-methoxyethanol, 2-(2-methoxyethoxy)ethanol, 2-[2-(2-methoxyethoxy)ethoxy]ethanol, and 2-[2-(2-ethoxyethoxy)ethoxy]ethanol; aromatic and heteroaromatic liquids, such as benzene, pyridine, and quinoline; and other such organic liquids known in the art. Water is a particularly preferred solvent. Other solvents can, of course, also often be used, but it is generally advisable to avoid solvents that can react with the reactive components. The quantity of solvent is generally not critical but should be an amount sufficient to dissolve or suspend the components of the reaction mixture but not so large as to require removal of excessive amounts after the process or any of the individual steps is complete. Typical quantities of solvent range from about 5 to about 30 parts by weight (preferably 7 to 20 parts by weight) relative to the amount of the perylene tetracarboxylic compound.

The mixture prepared in step (a) is maintained at temperatures that permit an initial reaction with the perylene tetracarboxylic compound to form a perylene intermediate without proceeding to the final perylene product. In general, temperature below about 25° C. (preferably about 0° C. to about 20° C.) are sufficient to allow conversion of carboxylic esters or cyclic anhydrides to corresponding amide intermediates (as the amine carboxylate salts) without significant further conversion to the ring-closed perylene imide products. When using carboxamide starting materials, the intermediate may actually be the same as the starting material.

The primary amines used in step (a) have the formula $R^A$—$NH_2$ in which $R^A$ is $C_1$–$C_6$ alkyl, $C_7$–$C_{16}$ aralkyl, or $C_6$–$C_{10}$ aryl. Examples of suitable primary amines include alkylamines such as methyl amine, ethyl amine, propyl amine, butyl amine, pentyl amine, hexyl amine, and isomeric forms thereof; aralkylamines such as benzylamine and phenethylamine; and arylamines such as aniline, anisidine, phenetidine, toluidine, and various xylidine isomers. It is necessary.to use at least a slight excess of ammonia or amine relative. to the anhydride and/or imide groups of the perylene tetracarboxylic compound. In general, about 1.1 to about 10 moles (preferably 1.5 to 5 moles) of ammonia or primary amine is used per mole of the anhydride and imide groups of the perylene tetracarboxylic compound. Although generally not preferred, it is possible to use larger quantities of ammonia or primary amine, which, if liquid under the reaction conditions, can even serve as solvent or as co-solvent.

The desired perylene bis-imide pigment composition is formed in step (b) by ring closing the perylene intermediate at a temperature of about 50° C. to about 250° C. (preferably from about 120° C. to about 150° C.) until reaction is complete, typically a period of about two to six hours.

An optional feature of step (b) is the use of non-pigmentary cyclic anhydrides or imides of formula (II). The term "non-pigmentary" means that the compounds are substantially colorless or are significantly less highly colored and lack good pigmentary properties in comparison to the perylene tetracarboxylic compounds and perylene pigment compositions with which they are used. That is, suitable cyclic anhydrides or imides of formula (II) would not themselves have practical utility as pigments. The term "substantially colorless" does not mean that the cyclic anhydrides or imides must be absolutely devoid of color in the visible region but instead means only that the compounds are insignificantly colored in comparison to the perylene pigments with which they are used. For example, preferred cyclic anhydrides or imides of formula (I) will exhibit molar absorptivities less (preferably at least about an order of magnitude less) than those of the perylene precursors and perylene pigment compositions with which theyare used.

When used to describe the non-pigmentary cyclic anhydrides or imides of formula (II) (including the compounds described below), the terms "$C_1$–$C_6$ alkyl," "$C_5$–$C_8$ cycloalkyl," "$C_7$–$C_{16}$ aralkyl," "$C_6$–$C_{10}$ aryl," "$C_1$–$C_6$ alkoxy," "sulfonyl group," "amino," "ammonium," and "halogen" have the same meanings as given above for the perylene tetracarboxylic compounds and amphoteric surfactants. The term "$C_1$–$C_{18}$ alkylene" refers to straight or branched chain aliphatic hydrocarbon groups having from 1 to 18 carbon atoms and two sites of attachment. Examples of $C_1$–$C_{18}$ alkylene are methylene, ethylene, propylene, butylene, pentylene, hexylene, and longer hydrocarbon chains, including both linear and branched chain groups. The term "$C_5$–$C_8$ cycloalkylene" refers to cycloaliphatic hydrocarbon groups having from 5 to 8 carbon atoms and two sites of attachment. Examples of $C_5$–$C_8$ cycloalkylene include 1,3-cyclopentylene, 1,4-cyclohexylene, and the like. The term "$C_2$-$C_6$ alkanoyl" refers to straight or branched chain alkanoyl groups having from 2 to 6 carbon atoms. Examples of $C_2$–$C_6$ alkanoyl are acetyl, propanoyl, butanoyl, pentanoyl, hexanoyl, and the isomeric forms thereof. The term "$C_7$–$C_{11}$ aroyl" refers to benzoyl and 1- or 2-naphthoyl in which the aryl portion can optionally be substituted as described above for "aryl."

Preferred cyclic anhydrides and imides are those in which $R^5$ and $R^6$ together form fused-on hydrocarbon rings (preferably fused-on cycloalkane and most preferably.aromatic ring systems, such as benzene or 1,2- or 2,3-naphthalene) and $R^7$ is hydrogen, $C_1$–$C_6$ alkyl, $C_7$–$C_{16}$ aralkyl, or $C_6$–$C_{10}$ aryl (preferably hydrogen), or in which $R^5$, $R^6$, and $R^7$ together form fused-on multiple hydrocarbon rings (most preferably polyaromatic ring systems, such as 1,8-naphthalene). Each of the fused ring systems can, of course, be ring-substituted, for example, with $C_1$–$C_6$ alkyl, $C_7$–$C_{16}$ aralkyl, $C_6$–$C_{10}$ aryl, $C_1$–$C_6$ alkoxy, sulfonyl, amino, ammon,ium, and halogen groups such as described above. For compounds of formula (I) in which W is $NR^4$ (i.e., imides), the $R^4$ group is preferably hydrogen, a metal, $C_1$–$C_6$ alkyl, or —Alk—X in which in which Alk is $C_1$–$C_{18}$ alkylene and X is —$SO_3^-$ or —$COO^-$ electrically balanced with hydrogen or a metal ion.

Particularly preferred cyclic anhydrides and imides include naphthalene compounds of formula (IIa)

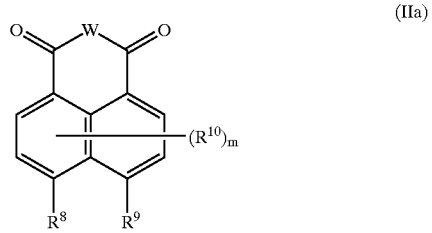

(IIa)

in which W is defined as above; $R^8$ and $R^9$ are independently hydrogen, $C_1$–$C_6$ alkyl, $C_1$–$C_6$ alkoxy, a sulfonyl group, amino, ammonium, hydroxy, nitro, or halogen or $R^8$ and $R^9$ taken together are a group represented by the formula

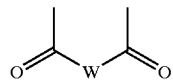

(wherein W is defined as before); each $R^{10}$ is independently $C_1$–$C_6$ alkyl, $C_1$–$C_6$ alkoxy, a sulfonyl group, amino, ammonium, hydroxy, nitro, or halogen; and m is zero or an integer of from 1 to 4. For compounds of formula (IIa) in which W is $NR^4$ (i.e., imides), the $R^4$ group is preferably hydrogen, a metal, $C_1$–$C_6$ alkyl, or —Alk—X in which in which Alk is $C_1$–$C_{18}$ alkylene and X is —$SO_3^-$ or —$COO^-$ electrically balanced with hydrogen or a metal ion. Examples of suitable cyclic anhydrides include naphthalic anhydride (i.e., 1,8-naphthalenedicarboxylic anhydride) and 1,4,5,8-naphthalenetetracarboxylic dianhydride. Examples of suitable cyclic imides include naphthalimide (i.e., 1,8-naphthalenedicarboximide), N-methylnaphthalimide, N-(2-sulfoethyl)naphthalimide and salts thereof, N-(2-sulfoethyl)-4-sulfonaphthalimide and salts thereof, N,N'-bis(2-sulfoethyl)-1,4,5,8-naphthalenetetracarboxylic diimide and salts thereof, and N-(carboxymethyl)naphthalimide and salts thereof.

Cyclic anhydrides of formula (II) (where W is O) can be obtained commercially or by conversion of corresponding dicarboxylic acids to the anhydrides using known methods, for example, by heating or by treating with a strong acid or other dehydrating agents. E.g., A. Streitweiser, Jr. and C. H. Heathcock, *Introduction to Organic Chemistry*, 3rd. edition (New York: Macmillan Publishing Company, 1985), pages 495 and 866.

Imides of formula (II) (where W is $NR^4$) can in turn be prepared from corresponding acids, esters, or anhydrides by known methods, preferably by reaction of a corresponding cyclic anhydride with at least a slight molar excess of a suitable amine. In a preferred method for preparing imides in which $R^4$ contains no ionic groups, the anhydride and amine react in water heated at about 80° C. to 100° C. at ambient pressure or at temperatures of up to about 140° C. in an autoclave or other sealed reactor, typically for about two to four hours. In a preferred method for preparing imides in which $R^4$ contains anionic groups (e.g., carboxylate, sulfonate, or phosphonate groups), the protonated amino group of the amphoteric amine precursor is converted into a free amino group by adding an equivalent of a base (such as sodium or potassium hydroxide) to the reaction mixture, after which the reaction is carried out under essentially the same conditions as used for nonionic compounds. However, if the resultant anionic compound is water-soluble, it must be isolated, for example, by acidifying the reaction mixture and isolating the free acid, by increasing the ionic strength of the mixture and isolating the otherwise soluble metal salt (i.e., sodium or potassium),.or by precipitating the imide by adding a polyvalent metal salt (e.g., $CaCl_2$, $BaCl_2$, or $FeCl_2$).

Imide salts of formula (II) in which W is $NR^4$ and $R^4$ is a metal can be prepared from corresponding "free" imides in which $R^4$ is hydrogen. Suitable imide salts of formula (I) are those in which each $R^4$ represents 1/n molar equivalents of an n-valent cation $M^{n+}$ (such as $Li^+$, $Na^+$, $K^+$, $Mg^{++}$, $Ca^{++}$, $Ba^{++}$, $Al^{+++}$, $Fe^{++}$, or $Fe^{+++}$). Such salts are formed whenever imides of formula (I) in which $R^4$ is hydrogen are exposed to strongly basic media, either from the reaction mixture used in step (a) or by addition of a strong base to the free imide.

Suitable solvents for use in step (b) include the same types of solvents described above for in step (a). Water is a particularly preferred solvent. Other solvents can, of course, also often be used, but it is generally advisable to avoid solvents that can react with the reactive components. The quantity of solvent is generally not critical but should be an amount sufficient to dissolve or suspend the components of the reaction mixture but not so large as to require removal of excessive amounts after the reaction is complete. Typical quantities of solvent range from about 5 to about 30 parts by weight (preferably 7 to 20 parts by weight) relative to the amount of the perylene tetracarboxylic compound. Solvents may not be necessary in step (b) if one or more of components are themselves liquids or if the mixture of components can be melted without significant decomposition to undesired by-products.

Additives can optionally be added during either steps (a) or step (b). Suitable additives can be any of the customary pigment preparation additives known in the art that serve, for example, to improve color properties, lessen or avoid flocculation, increase pigment dispersion. stability, and reduce coating viscosity. Suitable additives include, for example, dispersants or surfactants other than those of the present invention and various pigment derivatives. Examples of suitable dispersants include anionic compounds, such as fatty acids (such as stearic or oleic acid), fatty acid salts (i.e., soaps such as alkali metal salts of fatty acids), fatty acid taurides or N-methytaurides, alkylbenzenesulfonates, alkylnaphthalenesulfonates, alkylphenol polyglycol ether sulfates, naphthenic acids or resin acids (such as abietic acid); cationic compounds, such as quaternary ammonium salts, fatty amines, fatty amine ethylates, and fatty amine polyglycol ethers; and nonionic compounds, such as fatty alcohol polyglycol ethers, fatty alcohol polyglycol esters, and alkylphenol polyglycol ethers. Examples of suitable pigment additives include organic pigments having one or more sulfonic acid groups, sulfonamide groups, carboxylic acid, carboxamide, and/or (hetero)aryl-containing (cyclo)aliphatic groups (such as phthalimidomethyl). Such additives can be incorporated in amounts ranging from about 0.05 to 20% by weight (preferably 1 to 10% by weight), based on the amount of pigment.

During the process of the present invention, the ammonia or primary amine may react with acid anhydrides and/or imides that are present in compounds of formula (II) to form corresponding imides in which at least some portion of group $R^4$ is replaced with hydrogen (from ammonia) or group $R^A$ (from amine $R^A$—$NH_2$). However, regardless of whether the non-pigmentary cyclic anhydrides or imides are transformed in this manner, the perylene pigment compositions obtained by the process of the invention exhibit improved properties.

Upon completion of step (b), the reaction mixture is cooled and the pigment is collected, for example, by filtration, centrifugation, or other known methods.

The pigment composition can optionally be conditioned using methods known in the art, such as acid treatment, solvent treatment, and/or milling. Final particle size of the pigment can be controlled by varying the method of after-treatment. For example, pigments can be made more transparent by reducing the particle size or more opaque by increasing the particle size. Suitable milling methods include dry-milling methods such as jet milling, ball milling, and the like, with or without additives, or wet-milling methods such as salt kneading, sand milling, bead milling, and the like in water or organic solvents, with or without additives.

During or after the optional conditioning step, it is often desirable to use various other optional ingredients that provide improved properties. Examples of such optional ingredients include fatty acids having at least 12 carbon atoms, such as stearic acid or behenic acid, or corresponding amides, esters, or salts, such as magnesium stearate, zinc stearate, aluminum stearate, or magnesium behenate; quaternary ammonium compounds, such as tri[($C_1$–$C_4$ alkyl) benzyl]ammdnium salts; plasticizers, such as epoxidized soya bean oil; waxes, such as polyethylene wax; resin acids, such as abietic acid, rosin soap, hydrogenated or dimerized rosin; $C_{12}$–$C_{18}$-paraffin-disulfonic acids; alkylphenols; alcohols, such as stearyl alcohol; amines, such as laurylamine or stearylamine; and aliphatic 1,2-diols, such as dodecane-1,2-diol. Such additives can be incorporated in amounts ranging from about 0.05 to 20% by weight (preferably 1 to 10% by weight), based on the amount of pigment. The pigment compositions can also be blended (preferably by dry blending) with one or more pigment derivatives known in the art, particularly sulfonic acid, sulfonamide, and phthalimide derivatives.

Because of their light stability and migration properties, the perylene pigment compositions according to the present invention are suitable for many different pigment applications. For example, pigment compositions according to the invention can be used as the colorant (or as one of two or more colorants) for very lightfast pigmented systems. Examples include pigmented mixtures with other materials, pigment formulations, paints, printing ink, colored paper, or colored macromolecular materials. The term "mixtures with other materials" is understood to include, for example, mixtures with inorganic white pigments, such as titanium dioxide (rutile) or cement, or other inorganic pigments. Examples of pigment formulations include. flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. The materials pigmented with the perylene pigment compositions of the present invention can have any desired shape or form.

The pigment compositions according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastic materials).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Test Methods

Dispersibility in flexible polyvinyl chloride ("PVC") was evaluated by comparing hot-milled and cold-milled color development according to the following procedure. For each sample tested, a mixture of 48.95 g of flexible PVC and 1.0 g of a 50% titanium dioxide paste was added to a hot (155° C.) two-roll mill having a nip thickness of 25 mils (ca. 0.6 mm) and fluxed until uniform. A 0.050 g portion of the test pigment or comparison pigment was sprinkled into the nip over a period of about ten seconds, after which the fluxed material was cut and rolled on the mill for five minutes. The pigmented sheet was then removed from the mill and placed on a clean flat surface to cool. A piece cut from the resultant sheet and allowed to cool to room temperature was used as the "hot-milled" sample for evaluation. A sample cut from the same sheet while still warm was placed on a cold (24° C.) two-roll mill having a nip thickness of 21 mils (ca. 0.5 mm), then folded and passed through the mill seven times. The cold-rolled sheet was again fluxed in the hot mill until smooth. A sample cut from the resultant sheet was used as the "cold-milled" sample for evaluation.

The reflectances of corresponding hot-milled and cold-milled samples were determined using a Datacolor CS-5 spectrophotometer and converted to K/S values according to the Kubelka-Munk equation. Dispersibilities were calculated by comparing the K/S value of each hot-milled sample with the K/S value of the corresponding cold-milled samples (which are assumed to have reached 100% dispersion and maximum K/S values). In general, dispersibilities were considered excellent for values of 80% to 100%, good for values of at least 60% but less than 80%, fair if at least 40% but less than 60%, poor if at least 20% but less than 40%, and very poor if less than 20%.

Starting Materials

Commercially available naphthalic anhydride was used in the examples, both as component (b) of the invention and as a starting material for other compounds within the definition of component (b).

Cyclic imides used in the examples according to the invention were prepared as described below:

Preparation 1

N-(2-Sulfoethyl)naphthalimide, calcium salt

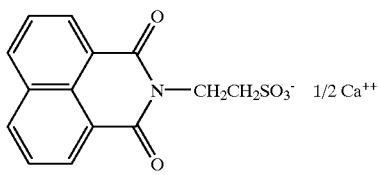

To a suspension of 39.8 g (0.2 mol) of naphthalic anhydride in 1.2 liters of water was added 50 g (0.4 mol) of taurine and 26.4 g of 85% potassium hydroxide flake. The mixture was then stirred in a sealed autoclave at 150° C. for five hours and allowed to cool. To the resultant yellow slurry was added a solution of 40 g of calcium chloride dihydrate in 60 g of water and the mixture was stirred for 30 minutes. The resultant precipitate was collected by filtration, washed with water until free of residual calcium, and dried in an oven at 80° C. to yield 70 g of N-(2-sulfoethyl) naphthalimide as the calcium salt.

Preparation 2

N-(Carboxymethyl)naphthalimide

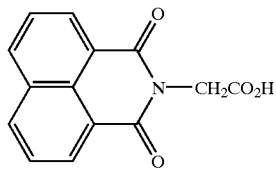

To a solution prepared by stirring a slurry of 18.9 g of glycine in 219 g of water with 37.4 g of 45% KOH was added 25.0 g of naphthalic anhydride. The mixture was stirred for one hour at pH 10.3, then heated to 80° C. and held at that temperature for two hours. The nearly clear black solution having a few white flecks was then heated at 90° C. for three hours, during which time the white specks disappeared, and then cooled to 45° C. The resultant clear black solution was acidified with 40.0 g of 75% phosphoric acid. The resultant cream-colored precipitate was collected by filtration, washed with water containing a few drops of phosphoric acid, and dried in an oven at 70° C. to yield 30.4 g (94.4%) of N-(carboxymethyl)naphthalimide. Ultraviolet spectroscopy (i.e., $\lambda_{max}$ 340 nm) was consistent with naphthalic anhydride derivatives and HPLC indicated one major component and only 1.0% naphthalic anhydride.

Example 1

A mixture of 100 g (0.255 mol) of perylene-3,4,9,10-tetracarboxylic dianhydride and 10 g (0.027 mol) of 35% aqueous cocamidopropyl betaine was stirred in a mixture of 950 g of water and 450 g of ice. To the cold (less than 5° C.) slurry was added dropwise 79.2 g (1.02 mol) of 40% aqueous methylamine over a period of five minutes. The mixture was stirred for one hour, during which time the temperature rose to about 15–20° C. After adding 5.0 g (0.015 mol) of N-(2-sulfoethyl)naphthalimide, calcium salt, the mixture was heated at 80° C. for about thirty minutes and then at 145° C. for four hours. The reaction mixture was cooled and diluted with water to about 2.5 liters. An aqueous emulsion containing 0.3 g of sodium dioctyl sulfosuccinate and 3.0 g of aliphatic naphtha was added and the slurry heated at 45° C. for three hours. The solid component was collected by filtration, washed with water, dried, and ground to give 95 g of N,N-dimethylperylenediimide (Pigment Red 179). Test results are shown in the table below.

Example 2

A mixture of 100 g (0.255 mol) of perylene-3,4,9,10-tetracarboxylic dianhydride and 10 g (0.027 mol) of 35% aqueous cocamidopropyl betaine was stirred in a mixture of 950 g of water and 450 g of ice. To the cold (less than 5° C.) slurry was added dropwise 79.2 g (1.02 mol) of 40% aqueous methylamine over a period of five minutes. The mixture was stirred for one hour, during which time the temperature rose to 15–20° C. After adding 5.0 g (0.02 mol) of N-carboxymethyl naphthalimide, the mixture was heated at 80° C. for about thirty minutes and then at 145° C. for four hours. The reaction mixture was cooled and diluted with water to about 2.5 liters. An aqueous emulsion containing 0.3 g of sodium dioctyl sulfosuccinate and 3.0 g of aliphatic naphtha was added and the slurry heated at 45° C. for three hours. The solid component was collected by filtration, washed with water, dried and ground to give 95 g of N,N-di-methylperylenediimide (Pigment Red 179). Test results are shown in the table below.

Example 3 (Comparison)

Example 2 was repeated except for omitting the cocamidopropyl betaine and the naphthalic anhydride derivative. Test results are shown in the table below.

Example 4 (Comparison)

Example 2 was repeated except for omitting the naphthalic anhydride derivative. Test results are shown in the table below.

TABLE

Test results for Examples 1–4

| Example | Dispersibility | Color Properties | | |
| --- | --- | --- | --- | --- |
| | | L* | a* | b* |
| 1 | 82.04 | 56.76 | 34.29 | 4.05 |
| 2 | 75.84 | 57.40 | 32.38 | 1.84 |
| 3 (comp) | 34.11 | 55.26 | 37.52 | 9.35 |
| 4 (comp) | 84.21 | 56.13 | 36.38 | 9.42 |

The data in the table shows that pigment compositions prepared using nitrogen-containing amphoteric surfactants and cyclic anhydrides and imides according to the invention exhibit improved dispersibility and a shift to a bluer shade (as measured by less positive b*).

What is claimed is:

1. A process for preparing perylene pigment compositions comprising
(a) reacting, at a temperature of less than about 25° C., a mixture comprising
(1) a perylene tetracarboxylic compound, (2) at least about 0.1% by weight, relative to the perylene tetracarboxylic compound, of one or more surfactants of formula (I)

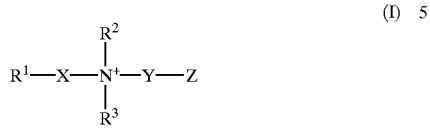

wherein
$R^1$ is a straight or branched chain $C_8$–$C_{30}$ aliphatic group or a modified straight or branched chain $C_8$–$C_{30}$ aliphatic group in which at least one carbon atom in the main chain of the aliphatic group is replaced with —O—, —S—, —CONH—, —NHCO—, —CH=CH—, —OSi($C_1$–$C_4$ alkyl)$_2$—, or optionally substituted $C_5$–$C_7$ cycloalkylene,
$R^2$ is hydrogen, $C_1$–$C_6$ alkyl, or —Y—Z',
$R^3$ is hydrogen or $C_1$–$C_6$ alkyl, or $R^2$ and $R^3$ together are $C_4$–$C_7$ alkylene,
X is a direct bond or —NHC(=NH)—, or X and $R^2$ taken together with the N$^+$ form a five- to seven-membered heterocyclic ring,
Y is difunctional $C_1$–$C_8$ (cyclo)aliphatic,
Z is —COO$^-$, —SO$_3^-$, —PO$_3^-$.1/n M$^{n+}$ (wherein M$^{n+}$ is a hydrogen ion or an n-valent cation), or OH, and Z' is —COO$^-$.1/n M$^{n+}$, —SO$_3^-$.1/n M$^{n+}$, or —PO$_3^-$.2/n M$^{n+}$
(wherein M$^{n+}$ is a hydrogen ion and/or an n-valent cation) or OH, with the proviso that Z' and Z cannot both be OH, (3) an equivalent excess, relative to the amount of the perylene tetracarboxylic compound, of ammonia or a primary amine having the formula $R^A$—NH$_2$, wherein $R^A$ is $C_1$–$C_6$ alkyl, $C_7$–$C_{16}$ aralkyl, or $C_6$–$C_{10}$ aryl, and (4) 0 to about 100 parts by weight, per part by weight of the perylene tetracarboxylic compound, of a solvent, to form a perylene intermediate;

(b) heating the perylene intermediate at a temperature of about 50° C. to about 250° C. in the presence of (1) 0 to about 20% by weight, relative to the perylene intermediate, of a non-pigmentary cyclic anhydride or imide having the formula (II)

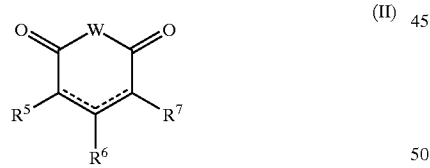

wherein
W is O or NR$^4$,
$R^4$ is hydrogen, a metal, $C_1$–$C_6$ alkyl, $C_5$–$C_8$ cycloalkyl, $C_7$–$C_{16}$ aralkyl, $C_6$–$C_{10}$ aryl, or —Alk—X,
$R^5$, $R^6$, and $R^7$ are independently hydrogen, $C_1$–$C_6$ alkyl, $C_7$–$C_{16}$ aralkyl, or $C_8$–$C_{10}$ aryl, or $R^5$ and $R^6$ together are fused-on rings and $R^7$ is hydrogen, $C_1$–$C_6$ alkyl, $C_7$–$C_{16}$ aralkyl, or $C_6$–$C_{10}$ aryl, or $R^5$, $R^6$, and $R^7$ together are fused-on rings,
the dotted line is an optional double bond representing $R^5$—C=C—$R^6$ or $R^6$—C=C—$R^7$,
Alk is $C_1$–$C_{18}$ alkylene or $C_5$–$C_8$ cycloalkylene, and X is
(i) an anionic group selected from —SO$_3^-$, —COO$^-$, —PO$_3^=$, —PO(OR$^x$)O$^-$ (wherein R$^x$ is $C_1$–$C_6$ alkyl), —O—PO$_3^=$, and —O—PO(OR$^y$)O$^-$ (wherein R$^y$ is $C_1$–$C_6$ alkyl), each such anionic group being electrically balanced with a stoichiometric amount of a cation,
(ii) a cationic group having the formula —NR$^a$R$^b$R$^{c+}$ (wherein R$^a$, R$^b$, and R$^c$, are independently hydrogen, $C_1$–$C_6$ alkyl, $C_7$–$C_{16}$ aralkyl, or $C_6$–$C_{10}$ aryl), each such cationic group being electrically balanced with a stoichiometric amount of an anion,
(iii) NR$^d$R$^e$, wherein R$^d$ is hydrogen, $C_1$–$C_6$ alkyl, $C_7$–$C_{16}$ aralkyl, $C_6$–$C_{10}$ aryl, $C_2$–$C_6$ alkanoyl, $C_7$–$C_{11}$ aroyl, or sulfonyl and R$^e$ is hydrogen, $C_1$–$C_6$ alkyl, $C_7$–$C_{16}$ aralkyl, or $C_6$–$C_{10}$ aryl,
(iv) OR$^f$, wherein R$^f$ is hydrogen, $C_1$–$C_6$ alkyl, or $C_6$–$C_{10}$ aryl,
(v) COOR$^g$, wherein R$^g$ is $C_1$–$C_6$ alkyl, $C_7$–$C_{16}$ aralkyl, or $C_6$–$C_{10}$ aryl,
(vi) sulfonyl, or
(vii) $C_6$–$C_{10}$ aryl; and (2) 0 to about 30% by weight, relative to the perylene intermediate, of a solvent,
thereby forming the perylene pigment composition; and
(c) collecting the perylene pigment composition.

2. A process according to claim 1 wherein the perylene tetracarboxylic compound is a compound of the formula

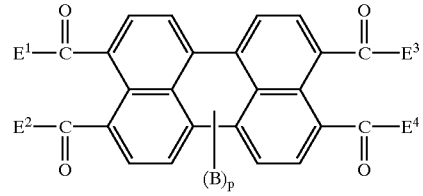

wherein
$E^1$ and $E^3$ are independently OR or NR'R" and $E^2$ and $E^4$ are independently OR, or $E^1$ and $E^2$ together are O or NA$^1$ and $E^3$ and $E^4$ together are O or NA$^2$,
each R is independently hydrogen, a metal or ammonium cation, $C_1$–$C_6$ alkyl, $C_7$–$C_{16}$ aralkyl, or $C_6$–$C_{10}$ aryl,
each R' and R" is independently hydrogen, $C_1$–$C_{16}$ alkyl, or $C_7$–$C_{16}$ aralkyl,
A$^1$ and A$^2$ are independently hydrogen, a metal, $C_1$–$C_6$ alkyl or substituted $C_1$–$C_6$ alkyl, $C_5$–$C_8$ cycloalkyl or substituted $C_5$–$C_8$ cycloalkyl, $C_7$–$C_{16}$ aralkyl or substituted $C_7$–$C_{16}$ aralkyl, or $C_6$–$C_{10}$ aryl or substituted $C_6$–$C_{10}$ aryl,
B is $C_1$–$C_6$ alkyl, $C_1$–$C_6$ alkoxy, a sulfonyl group, amino, ammonium, hydroxy, nitro, or halogen, and
p is zero or an integer of from 1 to 8.

3. A process according to claim 2 wherein the perylene tetracarboxylic compound is a bis-anhydride wherein E$^1$ and E$^2$ together and E$^3$ and E$^4$ together are oxygen atoms and B is absent.

4. A process according to claim 2 wherein the perylene tetracarboxylic compound is a bis-imide wherein E$^1$ and E$^2$ together and E$^3$ and E$^4$ together are independently each NH or a nitrogen atom substituted with $C_1$–$C_6$ alkyl, $C_7$–$C_{16}$ aralkyl, or $C_6$–$C_{10}$ aryl and B is absent.

5. A process according to claim 1 wherein the surfactant is a non-cyclic surfactant of the formula

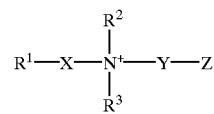

wherein
$R^1$ is $C_8$–$C_{30}$ aliphatic or modified $C_8$–$C_{30}$ aliphatic in which at least one carbon atom in the main chain is replaced with —O—, —CONH—, —NHCO—, or —CH=CH—;

$R^2$ and $R^3$ are independently hydrogen or $C_1$–$C_6$ alkyl;

X is a direct bond or —NHC(=NH)—;

Y is $C_1$–$C_6$ alkylene; and

Z is —COO⁻, —SO$_3^-$, or OH, with the proviso that if Z is OH, then a stoichiometric amount of an anionic counterion must be present.

6. A process according to claim 1 wherein the surfactant is cocamidopropyl betaine.

7. A process according to claim 1 wherein component (a)(3) is ammonia, a $C_1$–$C_6$ alkylamine, benzylamine, phenethylamine, aniline, anisidine, phenetidine, toluidine, or a xylidine.

8. A process according to claim 1 wherein, in the non-pigmentary cyclic anhydride or imide, $R^5$ and $R^6$ together form a fused-on hydrocarbon ring and $R^7$ is hydrogen.

9. A process according to claim 1 wherein, in the non-pigmentary cyclic anhydride or imide, $R^5$, $R^6$, and $R^7$ together form a fused-on polyaromatic ring.

10. A process according to claim 1 wherein the non-pigmentary cyclic anhydride or imide is a compound of the formula

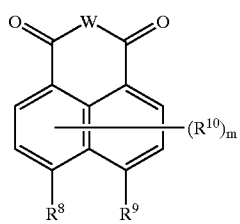

wherein

W is O or $NR^4$, $R^4$ is hydrogen, a metal, $C_1$–$C_6$ alkyl, or —Alk—X, $R^8$ and $R^9$ are independently hydrogen, $C_1$–$C_6$ alkyl, $C_1$–$C_6$ alkoxy, a sulfonyl group, amino, ammonium, hydroxy, nitro, or halogen or $R^8$ and $R^9$ taken together are a group represented by the formula

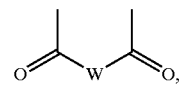

each $R^{10}$ is independently $C_1$–$C_6$ alkyl, $C_1$–$C_6$ alkoxy, a sulfonyl group, amino, ammonium, hydroxy, nitro, or halogen;

Alk is $C_1$–$C_{18}$ alkylene,

X is —SO$_3^-$, or —COO⁻ electrically balanced with hydrogen or a stoichiometric amount of a metal ion; and m is zero or an integer of from 1 to 4.

11. A process according to claim 1 wherein component (b) is naphthalic anhydride or 1,4,5,8-naphthalenetetracarboxylic dianhydride.

12. A process according to claim 1 wherein component (b) is naphthalimide, N-methylnaphthalimide, N-(2-sulfoethyl) naphthalimide or a salt thereof, N-(2-sulfoethyl)-4-sulfonaphthalimide or a salt thereof, N,N'-bis(2-sulfoethyl)-1,4,5,8-naphthalenetetracarboxylic diimide or a salt thereof, or N-(carboxymethyl)naphthalimide or a salt thereof.

* * * * *